(12) United States Patent
Sugamoto et al.

(10) Patent No.: US 6,348,537 B2
(45) Date of Patent: Feb. 19, 2002

(54) COATING AGENT, AND RESIN MOLDED ARTICLE HAVING COATED LAYER

(75) Inventors: Hideyuki Sugamoto; Osamu Kawai; Tetsuya Sawano, all of Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/774,069

(22) Filed: Jan. 31, 2001

Related U.S. Application Data

(63) Continuation of application No. PCT/JP99/03906, filed on Jul. 22, 1999.

(30) Foreign Application Priority Data

Jul. 31, 1998 (JP) ............................................ 10-217648

(51) Int. Cl.[7] .................................................. C08K 3/34
(52) U.S. Cl. ...................................... 524/493; 524/847
(58) Field of Search ................................. 524/493, 847

(56) References Cited

FOREIGN PATENT DOCUMENTS

| JP | 57-131214 | 8/1982 |
| JP | 1-317115 A | 12/1989 |
| JP | 3-56514 | 3/1991 |
| JP | 4187512 A | 7/1992 |
| JP | 5-179157 | 7/1993 |
| JP | 5-297588 | 11/1993 |
| JP | 7-118008 | 5/1995 |
| JP | 8-114915 | 5/1996 |

*Primary Examiner*—Edward J. Cain
(74) *Attorney, Agent, or Firm*—Oblon, Spivak, McClelland, Maier & Neustadt, P.C.

(57) ABSTRACT

A coating agent comprising 50 to 99 parts by weight of a monomer or monomer mixture (M) composed of 50 to 100% by weight of a polyfunctional (meth)acrylate monomer (m-1) having two or more (meth)acryloyloxy groups and 0 to 50% by weight of a monofunctional (meth)acrylate monomer (m-2), and 1 to 50 parts by weight of colloidal silica, wherein the colloidal silica contains colloidal silica in a narrow and long form having an average diameter of 5 to 20 nm and an average length of 40 to 300 nm in an amount of 5 to 100% by weight based on the total colloidal silica weight; and a resin molded article having a coated layer obtained by hardening this coating agent, are disclosed. This colloidal silica-containing coating agent is excellent in appearance, hardness, abrasion resistance, weather resistance, adhesion with a substrate, no need of a solvent, and the like.

14 Claims, No Drawings

COATING AGENT, AND RESIN MOLDED ARTICLE HAVING COATED LAYER

This application is a Continuation of application International application number PCT/JP99/03906, filed on Jul. 22, 1999.

BACKGROUND OF THE INVENTION

1. Field of the Invention

The present invention relates to a coating agent comprising a polyfunctional (meth)acrylate monomer, and if desired, a monofunctional (meth)acrylate monomer and colloidal silica having a specific form, and a resin molded article having a coated layer excellent in abrasion resistance, weather resistance, adhesion with a substrate, and the like, obtained by hardening the coating agent.

2. Description of the Background

A resin molded article produced from polymethyl methacrylate, polycarbonate, polystyrene, AS resin and the like is used in various fields utilizing not only lighter weight and more excellent impact resistance as compared with glass products but also various merits such as excellent transparency, easy molding work property and the like.

However, on the contrary, these resin molded articles are deficient in abrasion resistance of the surface, therefore, tend to receive injury on the surface by contact, friction, scratch and the like with other hard substance, and consequently, commercial value thereof may be remarkably lowered by this injury, or the resin molded articles may become unusable in a short period of time. Therefore, improvement of abrasion resistance of the surface of these resin molded articles is desired strongly.

As the method for improving this point, JP-A Nos. 53-102936, 53-104638 and 54-97633, for example, disclose a method in which a hardening solution comprising a compound having a plurality of (meth)acryloyloxy groups in the molecule is applied on a molded article, and it is hardened by heat or an active energy ray such ultraviolet ray and the like, to obtain a molded article having excellent abrasion resistance. This method has merits that the hardening solution is relatively cheap, and excellent also in productivity. However, since the hardened coated film is made of an organic substance, the abrasion resistance of the coated molded article has a limitation.

On the other hand, as a method for imparting more hither abrasion resistance to a molded article, JP-A Nos. 48-26822 and 59-64671, for example, disclose a method in which an alkoxysilane compound is applied on the surface of a plastic molded article, and hardened with heat. Further, JP-A No. 56-106969, for example, discloses a method in which a mixture of colloidal silica and an organic resin is applied on the surface of a plastic molded article, and is hardened with heat. However, in these method, a drying process is necessary since a solvent is used, and energy consumption amount is large and a long period of time is required since hardening with heat is necessary, leading to industrial demerits. Moreover, evaporation of a solvent in processes for hardening and drying a coated film is not preferable also from the standpoint of protection of the global environment.

As a method for improving these problems, JP-A Nos. 57-131214 and 3-56514, for example, disclose a method in which a hardening solution comprising a compound having a plurality of (meth)acryloyloxy groups in the molecule, and colloidal silica is applied on a molded article, and hardened by an active energy ray such as ultraviolet ray and the like to obtain a coated molded article having high abrasion resistance. However, in this method, a coated molded article has a problem in weather resistance, and a coated molded article excellent in balance between abrasion resistance, weather resistance and adhesion of a coated layer with a substrate can not be obtained.

SUMMARY OF THE INVENTION

An object of the present invention is to provide a colloidal silica-containing coating agent which can form on the surface of a molded article a coated layer having excellent appearance and hardness and being excellent in balance between abrasion resistance, weather resistance and adhesion with a substrate and which can be formulated without no solvent, and a resin molded article having a coated layer formed by hardening this coating agent.

The present inventors have intensively studied for attaining the above-mentioned object, and resultantly, found that extremely excellent effects can be obtained by using colloidal silica having a specific form, leading to completion of the present invention.

Namely, the coating agent of the present invention is a coating agent comprising 50 to 99 parts by weight of a monomer or monomer mixture (M) composed of 50 to 100% by weight of a polyfunctional (meth)acrylate monomer (m-1) having at least two (meth)acryloyloxy groups in the molecule and 0 to 50% by weight of a monofunctional (meth)acrylate monomer (m-2) co-polymerizable with the monomer (m-1), and 1 to 50 parts by weight of colloidal silica, wherein the colloidal silica contains colloidal silica in a narrow and long form having an average diameter of 5 to 20 nm and an average length of 40 to 300 nm in an amount of 5 to 100% by weight based on the total colloidal silica weight.

Further, the resin molded article of the present invention is a resin molded article having a coated layer formed by hardening the coating agent of the present invention.

In the present invention, "(meth)acryloyl" means "acryloyl and/or methacryloyl".

DETAILED DESCRIPTION OF THE PREFERRED EMBODIMENTS

Preferred practical embodiments of the present invention will be described below.

The polyfunctional (meth)acrylate monomer (m-1) used in the invention is a monomer having at least two (meth)acryloyloxy groups in the molecule. A residual group to which each (meth)acryloyloxy group is bonded in this molecule is not particularly restricted, and in general, is constituted of a hydrocarbon or derivative thereof. Further, the residual group may contain an ether bond, thioether bond, ester bond, amide bond, urethane bond and the like.

As the polyfunctional (meth)acrylate monomer (m-1), there are listed, for example, esterified compounds obtained from polyhydric alcohol and (meth)acrylic acid or derivative thereof, or linear esterified compounds obtained from polyhydric alcohol and polyvalent carboxylic acid and (meth) acrylic acid or derivative thereof.

Specific examples of the esterified compound obtained from polyhydric alcohol and (meth)acrylic acid or derivative thereof include polyethylene glycol di(meth)acrylates such as diethylene glycol di(meth)acrylate, triethylene glycol di(meth)acrylate, tetraethylene glycol di(meth)acrylate and the like; 1,4-butanediol di(meth)acrylate, 1,6-hexanediol di(meth)acrylate, 1,9-nonanediol di(meth)acrylate, 3-acryloyloxy-2-hydroxypropyl (meth)acrylate, trimethylolpropane tri(meth)acrylate, trimethylolethane tri(meth)acrylate, pentaglycerol tri(meth)acrylate, pentaerythritol tri(meth) acrylate, pentaerythritol tetra(meth)acrylate, and glycerine tri(meth)acrylate.

Further, as the esterified compound obtained from polyhydric alcohol and (meth)acrylic acid or derivative thereof, compounds represented by the following general formula (III):

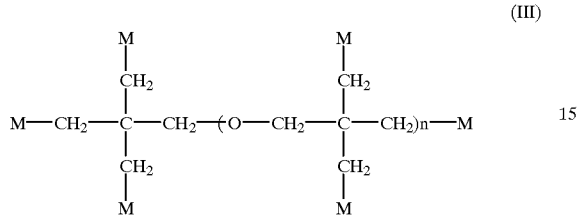

(wherein, at least three "M"s represent (meth)acryloyloxy group and the remaining "M"s represent a hydroxyl group, and n represents a positive integer of 1 to 4.) are also listed.

Specific examples of the compound of the general formula (III) include dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, and tripentaerythritol hepta(meth)acrylate.

The linear esterified compound obtained from polyhydric alcohol and polyvalent carboxylic acid and (meth) acrylic acid or derivative thereof is obtained by reacting a mixture so that the amount of the hydroxyl group of the polyhydric alcohol and the amount of the carboxyl group both of the polycarboxylic acid and (meth)acrylic acid become finally equivalent. Of saturated or unsaturated polyester poly(meth)acrylates thus obtained, particularly preferable examples thereof include polycondensates composed of a combination of malonic acid/trimethylolethane/(meth)acrylic acid, malonic acid/trimethylolpropane/(meth)acrylic acid, malonic acid/glycerine/(meth)acrylic acid, malonic acid/pentaerythritol/(meth)acrylic acid, succinic acid/trimethylolpropane/(meth)acrylic acid, succinic acid/glycerine/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/glycerine/(meth)acrylic acid, adipic acid/pentaerythritol/(meth)acrylic acid, glutaric acid/trimethylolethane/(meth)acrylic acid, glutaric acid/trimethylolpropane/(meth)acrylic acid, glutaric acid/glycerine/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerine/(meth)acrylic acid, sebacic acid/pentaerythritol/(meth)acrylic acid, fumaric acid/trimethylolethane/(meth)acrylic acid, fumaric acid/trimethylolpropane/(meth)acrylic acid, fumaric acid/glycerine/(meth)acrylic acid, fumaric acid/pentaerythritol/(meth)acrylic acid, itaconic acid/trimethylolethane/(meth) acrylic acid, itaconic acid/trimethylolpropane/(meth)acrylic acid, itaconic acid/glycerine/(meth)acrylic acid, itaconic acid/pentaerythritol/(meth)acrylic acid, maleic anhydride/trimethylolethane/(meth)acrylic acid, maleic anhydride/trimethylolpropane/(meth)acrylic acid, maleic anhydride/glycerine/(meth)acrylic acid, maleic anhydride/pentaerythritol/(meth)acrylic acid, and the like.

As the specific example of the polyfunctional (meth)acrylate monomer (m-1), there are listed urethane methacrylates obtained by reacting a diisocyanate compound such as trimethylolpropanetoluylene diisocyanate, hexamethylene diisocyanate, tolylene diisocyanate, diphenylmethane diisocyanate, xylene diisocyanate, 4,4'-methylenebis (cyclohexyl isocyanate), isophorone diisocyanate, hexamethylene diisocyanate and the like, or a polyisocyanate of the following general formula (I) obtained by trimerization:

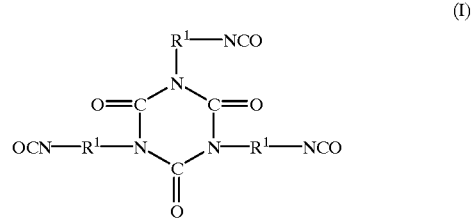

(wherein, each of $R^1$ independently represents a hydrocarbon group having 1 to 12 carbon atom(s).) with a (meth)acrylic monomer having active hydrogen [for example, 2-hydroxyethyl (meth)acrylate, 2-hydroxypropyl (meth)acrylate, 2-hydroxy-3-methoxypropyl (meth)acrylate, 1,2,3-propanetriol-1,3-di(meth)acrylate, 3-acryloyloxy-2-hydroxypropyl methacrylate and the like] according to an ordinary method; or poly ((meth)acryloyloxyethyl) isocyanurates such as di (meth)acrylates or tri(meth)acrylates of tris(2-hydroxy-ethyl) isocyanuric acid; and further, conventionally known various epoxy poly(meth)acrylates, urethane poly(meth)-acrylates and the like.

The fact that the polyfunctional (meth)acrylate monomer (m-1) contains an urethane (meth)acrylate obtained by reacting a polyisocyanate of the above-mentioned general formula (I) with a (meth)acrylic monomer having active hydrogen according to an ordinary method is preferable for obtaining a coated molded article excellent in balance between abrasion resistance, weather resistance and adhesion of a coated layer with a substrate. It is further preferable that an urethane (meth)acrylate of the following formula (II):

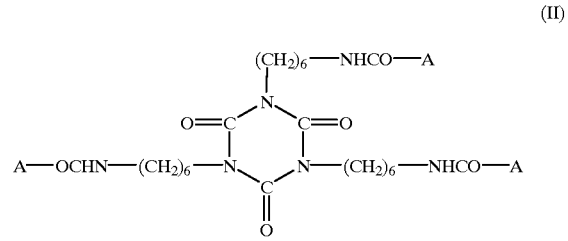

(wherein, each of A represents the following formula (IIa)

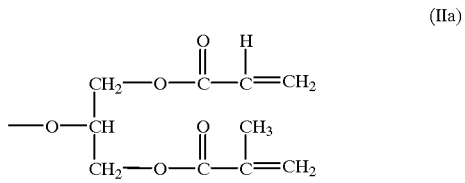

is contained.

In the present invention, the monofunctional (meth)acrylate monomer (m-2) used if necessary is a monomer having one (meth)acryloyloxy group copolymerizable with the polyfunctional (meth)acrylate monomer (m-1). A residual group bonded to this (meth)acryloyloxy group in the molecule is not particularly restricted, and in general, is constituted of a hydrocarbon or derivative thereof. Further, the residual group may contain an ether bond, thioether bond, ester bond, amide bond, urethane bond and the like.

Specific examples of the monofunctional (meth) acrylate monomer (m-2) include methyl (meth)acrylate, ethyl (meth) acrylate, butyl (meth)acrylate, isobutyl (meth)acrylate, t-butyl (meth)acrylate, 2-ethylhexyl(meth)-acrylate, dodecyl (meth)acrylate, cyclohexyl (meth)acrylate, 2-hydroxymethyl (meth)acrylate, 2-hydroxyethyl (meth) acrylate, 2-hydroxypropyl (meth)acrylate, 4-hydroxybutyl (meth)acrylate, glycidyl (meth)acrylate, tetrahydrofurfuryl (meth) acrylate, benzyl (meth)acrylate, ethoxyethyl (meth) acrylate, ethylcarbitol (meth)acrylate, 2-hydroxy-3-chloropropyl (meth)acrylate, 2,2,2-trifluoroethyl (meth)acrylate, 2,2,3,3-tetrafluoropropyl (meth)acrylate, 1H,1H,5H-octafluoropentyl(meth)acrylate, phenyl(meth)acrylate, iso-bonyl (meth) acrylate, dicyclopentenyloxyethyl (meth)acrylate, dicyclopentenyl(meth)acrylate, cyclohexyl (meth)acrylate and the like.

The monomer or monomer mixture (M) used in the present invention is composed of 50 to 100% by weight of a polyfunctional (meth)acrylate monomer (m-1) and 0 to 50% by weight of a monofunctional (meth)acrylate monomer (m-2). When the proportion of the monofunctional (meth)acry-late monomer (m-2) is over 50% by weight, sufficient hardness of a coated layer can not be obtained.

The colloidal silica used in the present invention contains colloidal silica in a specific form, namely, colloidal silica in a narrow and long form having an average diameter of 5 to 20 nm and an average length of 40 to 300 nm in an amount of at least 5% by weight based on the total colloidal silica weight. When the average diameter of this colloidal silica in a narrow and long form is less than 5 nm, the hardness of a coated layer decreases. On the other hand, when the average diameter is over 20 nm, appearance of a coated layer deteriorates. Further, when the average length is less than 40 nm, a coated molded article excellent in balance between abrasion resistance, weather resistance and adhesion of a coated layer with a substrate can not be obtained. On the other hand, when the average length is over 300 nm, appearance of a coated layer deteriorates.

The ratio of the length to the diameter of this colloidal silica in a narrow and long form is preferably 3 or more, and more preferably 5 or more. Further this narrow and long form may be bent, or branched.

The fine particle form of colloidal silica can be observed by diluting colloidal silica with a solvent, dropping the solution on a metal mesh applied with a collodion film, drying it, and watching the dried colloidal silica through a transmission electron microscope. The average diameter and the average length of colloidal silica can be obtained by a method in which colloidal silica is photographed using an electron microscope at a magnification of about 200000, the diameters and lengths of 30 pieces of colloidal silica randomly selected are measured, respectively, and the measured values are averaged separately for the diameter and length.

Of all colloidal silica, the proportion (content) of this narrow and long colloidal silica is from 5 to 100% by weight based on the total colloidal silica weight. When this amount is less than 5% by weight, a coated molded article excellent in balance between abrasion resistance, weather resistance and adhesion of a coated layer with a substrate can not be obtained. The content of this narrow and long colloidal silica is preferably from 30 to 100% by weight, and more preferably from 50 to 100% by weight.

When the content of the narrow and long colloidal silica is less than 100% by weight, namely, when colloidal silica having other form is used together, the form and particle size of this colloidal silica are not particularly restricted, and various colloidal silica may advantageously be used according to demands.

The content of colloidal silica is from 1 to 50 parts by weight based on 100 parts by weight of a coating agent. When this content is less than 1 part by weight, sufficient hardness of a coated layer can not be obtained. On the other hand, when this content is over 50 parts by weight, adhesion of a coated layer with a substrate deteriorate, and if a coating agent containing no solvent is formulated, the viscosity increases extremely, and good coatability can not be obtained. The content of colloidal silica is preferably from 3 to 40 pats by weight, more preferably from 5 to 30 parts by weight.

It is preferable that the colloidal silica used in the present invention is acryl-functionalized colloidal silica having a surface modified with a hydrolysate of a silane compound copolymerizable with a monomer or monomer mixture (M), from the standpoints of stability of a coating agent, development of hardness of a coated layer, and the like.

As this silane compound copolymerizable with a monomer or monomer mixture (M), there are listed compounds of the following general formula (IV):

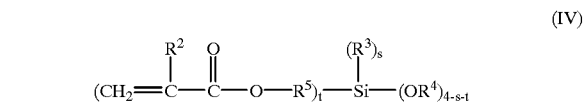

(IV)

(wherein, $R^2$ represents H or $CH_3$, $R^3$ and $R^4$ each independently represents H or an alkyl group having 1 to 10 carbon atom(S), $R^5$ represents an alkylene group having 1 to 10 carbon atom(S), s represents 0 or 1, and t represents 1 or 2.) such as γ-(meth)acryloyloxypropyltrialkoxysilane and the like; di-(meth)acryloyloxydialkoxysilane; silane compounds having a (meth)acryloyloxy group in the molecule obtained by Michael addition reaction of a primary or secondary amino group-containing silane or mercapto group-containing silane with a polyfunctional(meth)acrylate monomer; and the like. These silane compounds function as a polymerizable silane coupling agent, and when these are used, further, a non-polymerizable silane coupling agent can also be used together.

The silane compound obtained by Michael addition reaction of primary or secondary amino group-containing silane with a polyfunctional (meth)acrylate monomer is a compound synthesized according to a reaction mechanism represented by following reaction formula (V):

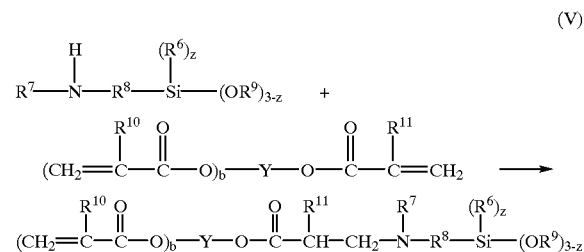

(V)

(wherein, $R^7$ is H or $CH_3$, $R^8$ is an alkylene group, $R^6$ and $R^9$ are an alkyl group, $R^{10}$ and $R^{11}$ are H or $CH_3$, Y is a di or more-valent hydrocarbon group or a hydrocarbon group having a substituent, and may contain an ether bond, ester bond or urethane bond. b represents an integer from 1 to 5, and z represents an integer from 0 to 2.).

The silane compound obtained by Michael addition reaction of mercapto group-containing silane with a polyfunctional (meth)acrylate monomer is a compound synthesized according to a reaction mechanism represented by the following reaction formula (VI):

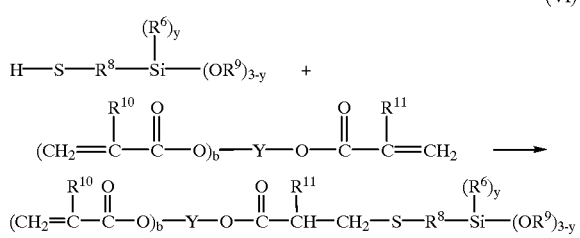

(wherein, $R^6$, $R^8$, $R^9$, $R^{10}$, $R^{11}$, Y and b are each the same as in the reaction formula (V), and y represents an integer from 0 to 2.).

As specific examples of the primary or secondary amino group-containing silane used in Michael addition reaction for obtaining the above-mentioned silane compound, N-(2-aminoethyl-3-aminopropyl)trimethoxysilane, 3-aminopropyltriethoxysilane, 3-aminopropyltrimethoxysilane and the like are listed.

Specific examples of the mercapto group-containing silane used in Michael addition reaction for obtaining the above-mentioned silane compound include
γ-mercaptopropyltrimethoxysilane,
γ-mercaptopropyltriethoxysilane,
γ-mercaptopropylmethyldimethoxysilane,
γ-mercaptopropylethyldimethoxysilane,
γ-mercaptopropylmethyldiethoxysilane,
γ-mercaptopropylethyldiethoxysilane,
γ-mercaptopropylbutyldimethoxysilane,
δ-mercaptobutyltrimethoxysilane,
δ-mercaptobutyldimethoxysilane,
δ-mercaptobutylethyldimethoxysilane,
δ-mercaptobutylmethyldiethoxysilane,
δ-mercaptobutylethyldiethoxysilane,
γ-mercaptoisobutyltrimethoxysilane,
γ-mercaptoisobutylmethyldimethoxysilane,
γ-mercaptobutyltrimethoxysilane,
γ-mercaptobutylmethyldimethoxysilane, γ-mercapto-2-hydroxypropyltrimethoxysilane, γ-mercapto-2-hydroxypropyltriethoxysilane, γ-mercapto-2-hydroxypropylmethyldimethoxysilane, γ-mercapto-2-hydroxypropylethyldiethoxysilane,
γ-mercaptopropyldimethylmethoxysilane,
γ-mercaptopropyldiethylethoxysilane,
β mercaptoethyltrimethoxysilane,
β-mercaptoethyltriethoxysilane,
γ-mercaptopropyltriaminosilane and the like.

As specific examples of the polyfunctional (meth) acrylate monomer used in Michael addition reaction for obtaining the above-mentioned silane compound, those various monomers as listed previously as specific examples of the polyfunctional (meth)acrylate monomer (m-1) can be listed likewise.

By using these silane compounds, an acryl-functionalzed colloidal silica having a surface modified with the hydrolysate thereof can be obtained. Herein, the phrase "having a surface modified with the hydrolysate thereof" means that a hydrolysate of a silane compound is retained by a condensation reaction on a part or all of the surface of colloidal silica, and by this, surface property is improved. This colloidal silica also include colloidal silica in which a compound obtained by further progress of the condensation reaction of a hydrolysate of a silane compound is retained in a like manner.

The surface modification can be conducted easily by hydrolysis of a silane compound in the presence of colloidal silica, or by causing hydrolysis and condensation reaction.

As the catalyst used in conducting hydrolysis of a silane compound, an inorganic acid or an organic acid can be used. As the inorganic acid, there are listed, for example, hydrohalogenic acids such as hydrochloric acid, hydrofluoric acid, hydrobromic acid and the like; sulfuric acid, nitric acid and phosphoric acid. As the organic acid, there are listed, for example, formic acid, acetic acid, oxalic acid, acrylic acid and methacrylic acid.

In the hydrolysis reaction system of a silane compound, a solvent can also be used for conducting the reaction tenderly and uniformly. As this solvent, those which can compatibilize a reaction product silane alkoxide and water, and a catalyst are desirable. As specific examples of the solvent, water; alcohols such as methanol, ethanol, isopropyl alcohol and the like; ketones such as acetone, methyl isobutyl ketone and the like; ethers such as tetrahydrofuran, dioxane and the like; and the like are listed. The use amount of the solvent is not particularly restricted providing it is an amount which can give uniform dissolution of a reaction product. However, it is preferable to control it at a suitable amount so as to give a concentration of the reaction product which does not delay the reaction speed remarkably.

The hydrolysis and condensation reaction of a silane compound is conducted preferably at a temperature from about room temperature to 120° C. for about 30 minutes to 24 hours, more preferably at a temperature from about room temperature to boiling temperature of a solvent for about 1 to 10 hours.

When acryl-functionalized colloidal silica having a modified surface is obtained by hydrolysis of a silane compound, the use amount of the silane compound is preferably from 0.1 to 500 parts by weight, more preferably from 0.5 to 200 parts by weight based 100 parts by weight of colloidal silica (solid content).

In a coating agent of the present invention, various additives such as an ultraviolet absorber, light stabilizer, surface smoothing agent, surfactant, heat stabilized, storage stabilizer and the like can be added if necessary. Among them, when a resin molded article on which a coating agent of the present invention has been coated and hardened is required to have weather resistance, it is preferable to add an ultraviolet absorber and/or light stabilizer to the coating agent.

As the ultraviolet absorber, there are listed, for example, benzotriazole-based, benzophenone-based, benzoate-based and cyanoacrylate-based ultraviolet absorbers. Specific examples thereof include 2-(2'-hydroxy-5'-tert-butylphenyl) benzo-triazole, 2-(2'-hydroxy-3,'5'-di-tert-butyphenyl) benzo-triazole, 2-(2'-hydroxy-3'-tert-butyl-5'-methylphenyl)-5-chlorobenzotriazole, 2-(2'-hydroxy-3',5'-tert-butylphenyl)-5-chlorobenzotriazole, 2-(2'-hydroxy-5'-methylphenyl)benzo-triazole, 2,2-methylenebis[4-(1,1,3,3-tetramethylbutyl)-6-(2H-benzotriazole-2-yl)phenol], 2-hydroxybenzophenone, 5-chloro-2-hydroxybenzophenone, 2,4-dihydroxybenzophenone, 2-hydroxy-4-methoxybenzophenone, 2-hydroxy-4-n- octoxybenzo-phenone, 4-dodecyloxy-2-hydroxybenzophenone, 2,2'-dihydroxy-4-methoxybenzophenone, 2,2'-dihydroxy-4,4'-dimethoxybenzo-phenone, 2-hydroxy-4-dodecyloxybenzophenone, phenyl salicylate, p-tert-butylphenylsalicylate, 3-hydroxyphenylbenzoate, phenylene-1,3-benzoate, 2-ethylhexyl-2-cyano-3,3'-diphenyl acrylate, and ethyl-2-cyano-3,3'-diphenyl acrylate. The addition amount of the ultraviolet absorber is preferably 10 parts by weight or less based 100 parts by weight of a coating agent from the standpoints of hardness of a coated layer and the like.

Specific examples of the light stabilizer include tetrakis(1,2,2,6,6-pentamethyl-4-piperidyl)1,2,3,4-butane tetracarboxylate, tetrakis(2,2,6,6-tetramethyl-4-piperidyl)1,2,3,4-butane tetracarboxylate, 4-methacryloyl-oxy-1,2,2,6,6-pentamethylpiperidine, 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine, bis(2,2,6,6-tetramethyl-4-piperidyl) sebacate, 4-benzoyloxy-2,2,6,6-tetramethylpiperidine, bis(1,2,2,6,6-pentamethyl-4-piperidyl)sebacate, and succinic acid dimethyl-1-(2-hydroxyethyl)-4-hydroxy-2,2,6,6-tetramethylpiperidine polycondensate. The addition amount of the light stabilizer is preferably 3 parts by weight or less based 100 parts by weight of a coating agent from the standpoints of hardness of a coated layer and the like.

As a method for applying a coating agent of the present invention on the surface of a substrate, a spray coat method, bar coat method, roller coat method, casting method, dipping method, air knife coat method, flow coat method, brush coat method and the like.

Also, a resin molded article having a coated layer can be obtained by applying a coating agent on a glass plate or stainless plate and hardening the coating agent, then, forming a mold using this glass plate or stainless plate, pouring raw materials of the resin molded article and polymerizing the raw materials.

Further, a resin molded article having a coated layer can also be obtained by applying a coating agent on inside of a mold, then, pouring a molten resin into the mold and cooking the resin.

A coating agent of the present invention can be used without using an organic solvent, and if necessary, it is preferable to use an organic solvent to control the viscosity of the coating agent.

As this organic solvent, there is suitably used a solvent which can be mixed uniformly with a polyfunctional (meth) acrylate monomer (m-1), a monofunctional (meth) acrylate monomer (m-2) and a polymerization initiator, and can uniformly disperse a coating agent itself. An organic solvent having a boiling point at normal pressure of 50° C. or more and 200° C. or less, and a viscosity at normal temperature (25° C.) of 10 mPa.s or less.

Specific examples of the organic solvent include alcohols such as methanol, ethanol, isopropanol, n-propyl alcohol, n-butyl alcohol, isobutyl alcohol and the like; aromatic hydrocarbons such as benzene, toluene, xylene and the like; ketones such as acetone, methyl ethyl ketone, methyl isobutyl ketone and the like; ethers such as dioxane, ethylene glycol monoethyl ether, ethylene glycol monobutyl ether and the like; esters such as methyl acetate, ethyl acetate, butyl acetate and the like; N,N-dimethylformamide; and the like. These organic solvents can be used alone or in combination of two or more.

The temperature of the surface of a substrate when a coating agent is applied on the surface of a substrate is preferably from 20 to 120° C. When this temperature is 20° C. or more, adhesion between a coated layer and the surface of a substrate tends to increase. On the other hand, when this temperature is 120° C. or less, the appearance of the coated layer tend to be improved.

The thickness of the surface of a substrate is preferably from 0.5 to 20 μm. When this thickness is 0.5 μm or more, the abrasion resistance of the coated layer tends to be improved. On the other hand, when this thickness is 20 μm or more, flexibility tends to increase and crack due to deformation tends to occur.

As the substrate, resin molded article, there are listed, for example, molded articles made of polymethyl methacrylate, a copolymer composed methyl methacrylate as the main constituent component, polystyrene, styrene-methyl methacrylate copolymer, styrene-acrylonitrile copolymer, polycarbonate, polyvinyl chloride resin, or polyester resin.

As a method for hardening a coating agent of the present invention, heat hardening, ultraviolet ray hardening, electron beam hardening and the like are listed.

When hardening is conducted by heat hardening or ultraviolet ray hardening, a polymerization initiator may advantageously be added to a coating agent. Specific examples of the polymerization initiator used for heat hardening include peroxide-based initiators such as lauroyl peroxide, benzoyl peroxide, propionoyl peroxide, tertiary butyl peroxy laurate, dicumy peroxide, ditertiary butyl peroxide, cumene hydroperoxide and the like; azo-based initiators such as 2,2'-azobisisobutyronitrile, 1,1'-azobis-1-cyclopentanonitrile, dimethyl-2,2'-azobis isobutyrate, 1,1'-azobiscyclohexanecarbonitrile, 4,4'-azobis-4-cyanovaleric acid, 2,2'-azobis-2-benzylpropionitrile and the like; and other initiators.

Specific examples of the polymerization initiator used for ultraviolet hardening include benzoin, benzoin methyl ether, benzoin ethyl ether, benzoin isopropyl ether, benzoin isobutyl ether, acetoin, butyloin, toluoin, benzyl, benzophenone, p-methoxybenzophenone, 2,2-diethoxyacetophenone, α,α-dimethoxy-α-phenylacetophenone, methylphenyl glyoxylate, ethylphenyl glyoxylate, 4,4'-bis(dimethylamino)benzophenone, 2-hydroxy-2-methyl-1-phenylpropane-1-one, 2,4,6-trimethylbenzoyldiphenylphosphine oxide, benzoyldiethoxyphosphine oxide, thioxanetone, 2-chlorothioxanetone, 2,4-dimethylthioxanetone, 2-isopropylthioxanetone, 2,4-diethylthioxanetone, 2,4-diisopropylthioxanetone and the like.

These polymerization initiator may be used alone or in combination of two or more. The addition amount of the polymerization initiator is preferably from 0.01 to 10 parts by weight based 100 parts by weight of a coating agent.

The present invention will be illustrated by examples in detail below. In the following descriptions, "part" represents "part by weight" unless otherwise state. Measurements and evaluations of various physical properties in the examples were conducted according to the following methods.

1) Adhesion With Substrate

Eleven cut lines along longitudinal direction and eleven cut lines along transverse direction were made at an interval of 1 mm on a coated layer of a sample by a blade of razor to give 100 grids, a cellophane tape was adhered closely on this, then, peeled quickly at an angle of 45° toward self direction, and the number N of grids remaining on the sample was calculated and the result was shown as N/100.

2) Appearance

The haze value (%) of a sample was measured by a haze meter.

3) Abrasion Resistance

Abrasion rings CALIBRASE CS-10F manufactured by Taber company were used, an abrasion test of 500 rotations at a load of 500 g for one ring was conducted on a coated layer of a sample, and the haze value of the abraded part was measured by a haze meter, according to a Taber abrasion test method. This measurement of the haze value was conducted at 4 positions on a track of the abrasion cycle, the average value thereof was calculated, and taber abrasion property (%) was represented as (haze value after taber test)—(haze value before taber test).

4) Weather Resistance

Sunshine Weather-o-meter (manufactured by Suga Shikenki K.K.) was used, a coated layer of a sample was exposed under conditions of 63° C. and rain, and appearance of the sample was visually observes after exposure for 1000, 2000 and 2500 hours, and occurrence of crack on the surface is represented by X and no occurrence of crack is represented by ○.

EXAMPLE 1

A mixture composed of 170 parts of isopropanol, 155 parts of 1,6-hexanediol diacrylate (manufactured by Osaka Organic Chemistry Industry Ltd., hereinafter, abbreviated as "C6DA"), 50 parts of γ-mercaptopropyltrimethoxysilane (Shin-Etsu Silicone K.K., trade name: KBM-803), and 0.9 parts of triphenylphosphine (hereinafter, abbreviated as "TPP") was stirred for 72 hours at room temperature. Then, 36 parts of this mixture and 1.6 parts of a 0.01 N aqueous hydrochloric acid solution were added to 145 parts of narrow and long colloidal silica (solid content: 15% by weight, average diameter: 10 nm, average length: 200 nm) dispersed in isopropanol, while stirring, and the mixture was further stirred for 4 hours at 80° C., and the surface of the narrow and long colloidal silica was modified with a hydrolysate of a silane compound. Then, 103 parts of C6DA was added, the mixture was stirred uniformly, and a volatile component was removed by deaeration under reduced pressure to give a filler dispersion (F1).

Then, to 100 parts of this filler dispersion (F1) was added 2.8 parts of 2,4,6-trimethylbenzoyldiphenylphosphine oxide (manufactured by BASF, trade name: Lucirin TPO, hereinafter, abbreviated as "TPO") and 1 part of benzophenone (manufactured by Wako Pure Chemical Co., Ltd.) as a photopolymerization initiator, 2-(2'-hydroxy-5'-tert-butylphenyl)benzotriazole (manufactured by Chiba Geigy, trade name: Tinuvin PS) as an ultraviolet ray absorber, and 1 parts of bis(2,2,6,6-tetramethyl-4-piperidyl)sebacate (manufactured by Sankyo Co., Ltd., trade name: Sanol LS770) as a light stabilizer, and the mixture was stirred for dissolution to prepared a coating agent (C1).

Then, this coating agent (C1) was applied by a casting method on a polycarbonate sheet having a length of 300 mm, a width of 300 mm and a thickness of 2 mm (manufactured by Mitsubishi Rayon Co., Ltd., trade name: Dialite P) having a surface temperature set at 30° C., 40° C. or 50° C. Then, a biaxially stretched film of polyethylene terephthalate having a thickness of 50 μm (hereinafter, abbreviated as "PET film") was covered on the sheet, and the thickness of the applied layer was set at 8 μm by using rubber rolls. Then, this laminate was allowed to pass at a speed of 3.0 m/min through a position at a distance of 150 mm under a metal halide lamp having an output of 120 W/cm$^2$ while the PET film being on the upper surface, to conduct hardening of the first stage. Then, the PET film was peeled, and the sheet was allowed to pass at a speed of 3.0 m/min through a position at a distance of 150 mm under a high pressure mercury lamp having an output of 120 W/cm$^2$ while the applied surface being on the upper surface, to form a coated layer. The evaluation results of the resulted sheet are shown in Table 1.

EXAMPLE 2

A coating agent (C2) was obtained and a coated layer was formed on the sheet in the same manner as in Example 1 except that 43 parts of a polyester acrylate obtained by a condensation reaction of trimethylolethane/succinic acid/acrylic acid (molar ratio: 2:1:4) (manufactured by Osaka Organic Chemical Industry Ltd., hereinafter, abbreviated as "TAS") and 60 parts of C6DA were added instead of addition of 103 parts of C6DA, at the stage of modification of the surface of narrow and long colloidal silica with a hydrolysate of a silane compound, in Example 1, and results as shown in Table 1 were obtained.

EXAMPLE 3

A filler dispersion (F3) was obtained in the same manner as in Example 1 except that 65 parts of TAS and 38 parts of C6DA were added instead of addition of 103 parts of C6DA, at the stage of modification of the surface of narrow and long colloidal silica with a hydrolysate of a silane compound, in Example 1.

Then, 30 parts of isopropanol, 30 parts of toluene, 2.8 parts of TPO, 1 part of benzophenone, 6 parts of 2-(2'-hydroxy-5'-tert-butylphenyl)benzotriazole and 1 parts of bis (2,2,6,6-tetramethyl-4-piperidyl)sebacate were added to 100 parts of this filler dispersion (F3), and the mixture was stirred for dissolution to prepared a coating agent (C3).

Then, this coating agent (C3) was applied by a flow coat method on a polycarbonate sheet having a length of 300 mm, a width of 300 mm and a thickness of 2 mm having a surface temperature set at 45° C. so that the thickness of the applied layer was 8 μm, and the coating agent was left for 5 minutes at room temperature. Then, hardening at the first stage and the second stage was conducted under the same conditions as in Example 1 except that no PET film was used while the applied surface being on the upper surface, to form a coated layer, and results as shown in Table 1 were obtained.

EXAMPLE 4

A mixture composed of 170 parts of isopropanol, 155 parts of C6DA, 50 parts of γ-mercaptopropyltrimethoxysilane, and 0.9 parts of TPP was stirred for 72 hours at room temperature. Then, 80 parts of this mixture and 3.6 parts of a 0.01 N aqueous hydrochloric acid solution were added to 100 parts of spherical colloidal silica (manufactured by Nissan Chemical Industry Ltd., trade name: IPA-ST, solid content: 30% by weight) dispersed in isopropanol, while stirring, and the mixture was further stirred for 4 hours at 80° C., and the surface of the spherical colloidal silica was modified with a hydrolysate of a silane compound. Then, 130 parts of C6DA was added, the mixture was stirred uniformly, and a volatile component was removed by deaeration under reduced pressure to give a filler dispersion (F4-1).

Then, 50 parts of this filler dispersion (F4-1), and 50 parts of a filler dispersion (F1) prepared in the same manner as in Example 1 were mixed to obtained a filler dispersion (F4-2). Next, a coating agent (C4) was prepared and a coated layer was formed on a sheet in the same manner as in Example 1, and results as shown in Table 1 were obtained.

EXAMPLE 5

A coating agent (C5) was obtained and a coated layer was formed on the sheet in the same manner as in Example 1 except that 23 parts of TAS, 20 parts of tetrahydrofurfuryl acrylate [manufactured by Osaka Organic Chemical Industry Ltd.] and 60 parts of C6DA were added instead of addition of 103 parts of C6DA, at the stage of modification of the surface of narrow and long colloidal silica with a hydrolysate of a silane compound, in Example 1, and results as shown in Table 1 were obtained.

EXAMPLE 6

A filler dispersion (F6) was obtained in the same manner as in Example 1 except that 39 parts of an urethane acrylate represented by the above-mentioned formula (II) (manufactured by Shin Nakamura Kagaku K.K., hereinafter, abbreviated as "U-6HA") and 64 parts of C6DA were added instead of addition of 103 parts of C6DA, at the stage of modification of the surface of narrow and long colloidal silica with a hydrolysate of a silane compound, in Example 1.

Then, 2.8 parts of TPO and 6 parts of Tinuvin PS were added to 100 parts of this filler dispersion (F6), and the mixture was stirred for dissolution to prepared a coating agent (C6). Next, a coated layer was formed on a sheet in the same manner as in Example 1 using this coating agent (C6), and results as shown in Table 1 were obtained.

EXAMPLE 7

A coating agent (C7) was obtained and a coated layer was formed on a sheet in the same manner as in Example 6 except that 29 parts of U-6HA, 29 parts of TAS and 45 parts of C6DA were added instead of addition of 39 parts of U-6HA and 64 parts of C6DA, in Example 6, and results as shown in Table 1 were obtained.

EXAMPLE 8

4 parts of γ-methacryloyloxypropyltrimethoxysilane (Shin-Etsu Silicone K.K., trade name: KBM-503), 1.6 parts of a 0.01 N aqueous hydrochloric acid solution were added to 145 parts of narrow and long colloidal silica (solid content: 15% by weight, average diameter: 10 nm, average length: 200 nm) dispersed in isopropanol, while stirring, and the mixture was stirred for 4 hours at 80° C., and the surface of the narrow and long colloidal silica was modified with a hydrolysate of a silane compound. Then, 62 parts of C6DA, 30 parts of U-6HA and 30 parts of TAS were added, the mixture was stirred uniformly, and a volatile component was removed by deaeration under reduced pressure to give a is filler dispersion (F8).

Then, to 100 parts of this filler dispersion (F8) was added 2.8 parts of TPO and 6 parts of Tinuvin PS, and the mixture was stirred for dissolution to prepared a coating agent (C8). Next, a coated layer was formed on a sheet in the same manner as in Example 1 using this coating agent (C8), and results as shown in Table 1 were obtained.

EXAMPLE 9

A coating agent (C9) was obtained in the same manner as in example 6 except that the amount of Tinuvin PS was changed to 0.5 parts in Example 6.

Then, this coating agent (C9) was applied by a casting method on an acryl resin sheet having a length of 300 mm, a width of 300 mm and a thickness of 2 mm (manufactured by Mitsubishi Rayon Co., Ltd., trade name: Acrylite E) having a surface temperature set at 50° C. Next, a PET film was covered on this to form a coated layer on the sheet in the same manner as in Example 1, and results as shown in Table 1 were obtained.

EXAMPLE 10

45 parts of isopropanol and 15 parts of toluene were added to 100 parts of a coating agent (C9), and the mixture was stirred for dissolution to prepare a coating agent (C10). Next, a coated layer was formed by a flow coat method on a sheet in the same manner as in Example 3 except that an acryl resin sheet was used instead of a polycarbonate sheet and the thickness of an applied layer was changed to 12 μm in Example 3, and results as shown in Table 1 were obtained.

EXAMPLE 11

Into a reaction vessel equipped with a cooling tube, thermometer and stirrer was fed 100 parts of methyl methacrylate, the content was heated while stirring until the inner temperature reached 80° C., at this point, 0.05 parts of 2,2'-azobis-(2,4-dimethylvaleronitrile) was added, the mixture was further heated until the inner temperature reached 90° C., this temperature was kept for 8 minutes, then, the mixture was cooled to room temperature, to prepare methylacrylate syrup (S1) having a polymerization proportion of about 22% and a viscosity at 20° C. of 1.5 Pa.s.

Separately, a filler dispersion (F11) was obtained in the same manner as in Example 1 except that 39 parts of U-6HA and 45 parts of C6DA were added instead of addition of 103 parts of C6DA, at the stage of modification of the surface of narrow and long colloidal silica with a hydrolysate of a silane compound, in Example 1.

Then, to 100 parts of this filler dispersion (F11) was added 1.5 parts of benzoin ethyl ether (manufactured by BASF) as a photopolymerization initiator, and 0.5 parts of Tinuvin as an ultraviolet ray absorber, and the mixture was stirred for dissolution to prepare a coating agent (C11).

This coating agent (C11) was applied by a casting method on a SUS304 plate having a length of 610 mm, a width of 460 mm and a thickness of 2 mm. Next, a PET film was covered on this, and the thickness of the applied layer was controlled to 20 μm by rubber rolls. This laminate was allowed to pass at a speed of 0.3 m/min through a position at a distance of 60 mm under a chemical lamp (FL-40BL, manufactured by Toshiba Corp.) while the PET film being on the upper surface, to conduct hardening of the first stage. Then, the PET film was peeled, and the plate was allowed to pass at a speed of 0.3 m/min through a position at a distance of 60 mm under a high pressure mercury lamp (H-4000L, manufactured by Toshiba Corp.) while the applied surface being on the upper surface, to form a coated layer.

Two SUS plates on which a coated layer was thus formed were allowed to face at an interval of 3 mm so that the coated layers were on inside, and a solution obtained by further adding 0.05 parts of 2,2'-azobis-(2.4-dimethylvaleronitrile) to 100 parts of the methyl methacrylate syrup (S1) previously prepared was poured between the SUS plates, circumferential parts were sealed with a soft vinyl chloride gasket, and these materials were polymerized by heating at 80° C. for 1 hour and at 130° C. for 1 hour, to obtain a resin sheet having a thickness of 2 mm carrying a coated layer on both sides. After cooling, the resin sheet was peeled from the SUS plate, and results as shown in Table 1 were obtained.

Comparative Example 1

An untreated polycarbonate sheet which is the same as used in Examples 1 to 8 and carries no coating agent applied was evaluated in a like manner. The results are shown in Table 1.

Comparative Example 2

A coating agent (C12) was obtained and a coated layer was formed on a sheet in the same manner as in Example 4 except that only 100 parts of a spherical colloidal silica filler dispersion (F-4-1) was used instead of 100 parts of a filler dispersion (F-4-2) composed of narrow and long colloidal silica and spherical colloidal silica as a dispersion for preparing a coating agent, and results as shown in Table 1 were obtained.

Comparative Example 3

The surface of spherical colloidal silica (IPA-ST) was modified with a hydrolysate of a silane compound in the same manner as in Example 4. Thereafter, 76 parts of C6DA and 54 parts of TAS were added, the mixture was stirred uniformly, and a volatile component was removed by deaeration under reduced pressure, to obtain a filler dispersion (F13). Next, a coating agent (C13) was prepared and a coated layer was formed on a sheet in the same manner as in Example 1, and results as shown in Table 1 were obtained.

As described above, according to a coating agent of the present invention, a coated layer having excellent appearance and hardness and excellent in balance between abrasion resistance, weather resistance and adhesion with a substrate can be formed on the surface of a molded article, and such a layer can be formed without using a solvent.

Further, a resin molded article of the present invention having a coated layer obtained by applying this coating agent and hardening it has excellent appearance and hardness and is excellent in balance between abrasion resistance, weather resistance and adhesion of the coated layer with a substrate. Therefore, this resin molded article is very useful for uses in which such abilities are required, such as window glass, sign boards, covers for illumination apparatuses, optical parts, automobile-related parts and the like.

TABLE 1

| | Surface temperature (° C.) | Coated layer adhesion | Appearance (%) | Abrasion resistance (%) | Weather resistance 1000 hrs. | 2000 hrs. | 2500 hrs. |
|---|---|---|---|---|---|---|---|
| Ex. 1 | 30 | 100/100 | 0.1 | 10 | ○ | ○ | X |
| | 40 | 100/100 | 0.2 | 9 | ○ | ○ | X |
| | 50 | 100/100 | 0.3 | 8 | ○ | ○ | X |
| Ex. 2 | 30 | 100/100 | 0.1 | 19 | ○ | ○ | X |
| | 40 | 100/100 | 0.1 | 12 | ○ | ○ | X |
| | 50 | 100/100 | 0.1 | 7 | ○ | ○ | X |
| Ex. 3 | 45 | 100/100 | 0.1 | 7 | ○ | ○ | X |
| Ex. 4 | 30 | 100/100 | 0.1 | 18 | ○ | ○ | X |
| | 40 | 100/100 | 0.2 | 12 | ○ | ○ | X |
| | 50 | 100/100 | 0.3 | 9 | ○ | ○ | X |
| Ex. 5 | 30 | 100/100 | 0.1 | 16 | ○ | ○ | X |
| | 40 | 100/100 | 0.2 | 10 | ○ | ○ | X |
| | 50 | 100/100 | 0.2 | 7 | ○ | ○ | X |
| Ex. 6 | 30 | 100/100 | 0.1 | 14 | ○ | ○ | ○ |
| | 40 | 100/100 | 0.1 | 11 | ○ | ○ | ○ |
| | 50 | 100/100 | 0.1 | 9 | ○ | ○ | ○ |
| Ex. 7 | 30 | 100/100 | 0.1 | 14 | ○ | ○ | ○ |
| | 40 | 100/100 | 0.1 | 12 | ○ | ○ | ○ |
| | 50 | 100/100 | 0.1 | 8 | ○ | ○ | ○ |
| Ex. 8 | 30 | 100/100 | 0.1 | 15 | ○ | ○ | ○ |
| | 40 | 100/100 | 0.1 | 11 | ○ | ○ | ○ |
| | 50 | 100/100 | 0.1 | 9 | ○ | ○ | ○ |
| Ex. 9 | 50 | 100/100 | 0.1 | 6 | ○ | ○ | ○ |
| Ex. 10 | 45 | 100/100 | 0.1 | 6 | ○ | ○ | ○ |
| Ex. 11 | — | 100/100 | 0.1 | 6 | ○ | ○ | ○ |
| Comp. Ex. 1 | — | — | 0.3 | 30 | Whitening and yellowing | Whitening and yellowing | Whitening and yellowing |
| Comp. Ex. 2 | 30 | 100/100 | 0.5 | 20 | X | X | X |
| | 40 | 100/100 | 1.0 | 14 | X | X | X |
| | 50 | 100/100 | 1.5 | 10 | X | X | X |
| Comp. Ex. 3 | 30 | 100/100 | 0.1 | 25 | X | X | X |
| | 40 | 100/100 | 0.2 | 21 | X | X | X |
| | 50 | 100/100 | 0.3 | 15 | X | X | X |

What is claimed is:

1. A coating composition, comprising 50 to 99 parts by weight of a monomer or monomer mixture (M) composed of 50 to 100% by weight of a polyfunctional (meth)acrylate monomer (m-1) having at least two (meth)acryloyloxy groups in the molecule and 0 to 50% by weight of a monofunctional (meth)acrylate monomer (m-2) copolymerizable with the monomer (m-1), and 1 to 50 parts by weight of colloidal silica which is acryl-functionalized colloidal silica having a surface modified with a hydrolysate of a silane compound copolymerizable with a monomer or monomer mixture (M), wherein the colloidal silica contains colloidal silica in a narrow and long form having an average diameter of 5 to 20 nm and an average length of 40 to 300 nm in an amount of 5 to 100% by weight based on the total colloidal silica weight.

2. The coating composition according to claim 1 wherein the polyfunctional (meth)acrylate monomer (m-1) contains at least an urethane (meth)acrylate obtained by reacting a polyisocyanate represented by the following formula (I):

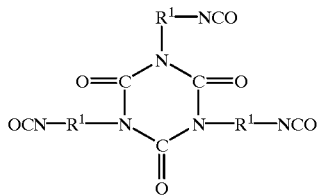

(wherein, each of $R^1$ independently represents a hydrocarbon group having 1 to 12 carbon atom(s).) with a (meth) acrylic monomer having active hydrogen.

3. The coating composition according to claim 1 wherein the polyfunctional (meth)acrylate monomer (m-1) contains at least an urethane (meth)acrylate represented by the following formula (II):

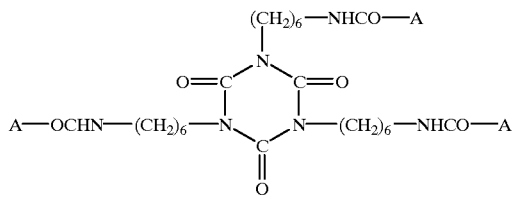

(wherein, each of A represents the following formula (IIa):

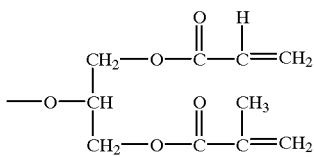

4. The coating composition according to claim 1, wherein the ratio of the length to the diameter of the narrow and long colloidal silica is 3 or more.

5. The coating composition according to claim 1, further containing an organic solvent.

6. The coating composition according to claim 1, wherein the monofunctional (meth)acrylate monomer (m-2) comprises methyl (meth)acrylate, ethyl (meth)acrylate, butyl (meth)acrylate, isobutyl (meth)acrylate, t-butyl (meth) acrylate, 2-ethylhexyl (methyl)acrylate, dodecyl (meth) acrylate, cyclohexyl (meth)acrylate, 2-hydroxymethyl (meth)acrylate, 2-hydroxyethyl (meth)acrylate, 2-hydroxypropyl (meth)acrylate, 4-hydroxybutyl (meth) acrylate, glycidyl (meth)acrylate, tetrahydrofurfuryl (meth) acrylate, benzyl (meth)acrylate, ethoxyethyl (meth)acrylate, ethylcarbitol (meth)acrylate, 2-hydroxy-3-chloro-propyl (meth)acrylate, 2,2,2-trifluoroethyl (meth)acrylate, 2,2,3,3-tetrafluoropropyl(meth)acrylate, 1H, 1H, 5H-octafluoropentyl (meth)acrylate, phenyl (meth)acrylate, isobornyl (meth)acrylate, dicyclopentenyloxyethyl (meth) acrylate, dicyclopentenyl (meth)acrylate and cyclohexyl (meth)acrylate.

7. The coating composition according to claim 1, wherein said colloidal silica in a narrow and long form is contained in said colloidal silica in an amount of from 30 to 100% by weight.

8. The coating composition according to claim 1, wherein said silane compound has the formula:

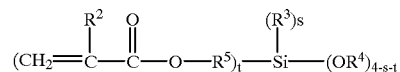

wherein $R^2$ is H or $CH_3$; $R^3$ and $R^4$ each independently is H or $C_1$–$C_{10}$ alkyl; $R^5$ and $C_1$–$C_{10}$ alkylene; s is 0 or 1; and t is 1 or 2.

9. The coating composition according to claim 8, wherein said silane compound comprises δ-(meth)acryloyloxypropyltrialkoxysilane, di(meth)acryloyloxydialkoxysilane or a silane compound having a (meth)acryloyloxy group in the molecule obtained by a Michael addition reaction of a primary or secondary amino group-containing silane or a mercapto group-containing silane with a polyfunctional (meth)acrylate monomer.

10. The coating composition according to claim 4, wherein the ratio of the length to the diameter of the colloidal silica is 5 or more.

11. The coating composition according to claim 5, wherein said organic solvent mixes uniformly with said polyfunctional (meth)acrylate monomer (m-1), and said monofunctional (meth)acrylate monomer (m-2).

12. The coating composition according to claim 5, wherein said organic solvent has a boiling point at normal pressure of from 50° C. to 200° C., and a viscosity of 25° C. of 10 mPa.s or less.

13. The coating composition of claim 5, wherein said organic solvent is selected from the group consisting of methanol, ethanol, isopropanol, n-propylalcohol, n-butylalcohol, isobutylalcohol, benzene, toluene, xylene, acetone, methylethylketone, methylisobutylketone, dioxane, ethyleneglycol monoethylether, ethyleneglycol monobutylether, methylacetate, ethylacetate, butylacetate, and N,N-dimethylformamide.

14. A resin molded article comprising a coated layer obtained by hardening the coating composition according to claim 1.

* * * * *